(12) United States Patent
Kearl et al.

(10) Patent No.: US 8,303,225 B2
(45) Date of Patent: Nov. 6, 2012

(54) WALL ANCHOR SYSTEM

(75) Inventors: Jacob Kearl, Ogden, UT (US); Lynn Vandyke, Layton, UT (US); Matthew Wiggins, Mayfield Heights, OH (US); Curtis Taylor, Chagrin Falls, OH (US)

(73) Assignee: Lifetime Products Inc., Clearfield, UT (US)

( * ) Notice: Subject to any disclaimer, the term of this patent is extended or adjusted under 35 U.S.C. 154(b) by 0 days.

(21) Appl. No.: 13/103,919

(22) Filed: May 9, 2011

(65) Prior Publication Data

US 2011/0271635 A1 Nov. 10, 2011

Related U.S. Application Data

(63) Continuation-in-part of application No. 12/640,596, filed on Dec. 17, 2009.

(51) Int. Cl.
*F16B 37/04* (2006.01)
(52) U.S. Cl. .................................. 411/344; 411/342
(58) Field of Classification Search ........... 411/340–345
See application file for complete search history.

(56) References Cited

U.S. PATENT DOCUMENTS

| 1,052,731 | A | * | 2/1913 | Law | 411/340 |
| 1,521,025 | A | * | 12/1924 | Hubener | 411/344 |
| 1,521,026 | A | * | 12/1924 | Hubener | 411/344 |
| 1,876,237 | A | * | 9/1932 | Jackson | 292/256.73 |
| 2,159,454 | A | * | 5/1939 | Shoup | 411/555 |
| 2,203,146 | A | * | 6/1940 | Hexdall | 411/344 |
| 2,567,372 | A | * | 9/1951 | Gelpcke | 411/342 |
| 3,762,068 | A | * | 10/1973 | Clay | 33/529 |
| 4,714,366 | A | * | 12/1987 | Boudrot | 402/13 |
| 6,213,701 | B1 | * | 4/2001 | Ukai | 411/345 |
| 7,828,501 | B2 | * | 11/2010 | Bauer et al. | 411/344 |
| 2009/0103999 | A1 | | 4/2009 | Fucito | |

OTHER PUBLICATIONS

U.S. Appl. No. 12/640,596 Office Action mailed Feb. 29, 2012.

* cited by examiner

*Primary Examiner* — Flemming Saether
(74) *Attorney, Agent, or Firm* — Kunzler Law Group, PC

(57) ABSTRACT

According to one embodiment, described herein is a wall anchor system includes an insert that is positionable within a hole in a wall. The wall anchor system further includes an anchor that is insertable into and passable through the insert. Additionally, the wall anchor system includes an elastic member that couples the insert and anchor. The insert and anchor remain coupled via the elastic member as the anchor is inserted into and passes through the insert.

18 Claims, 7 Drawing Sheets

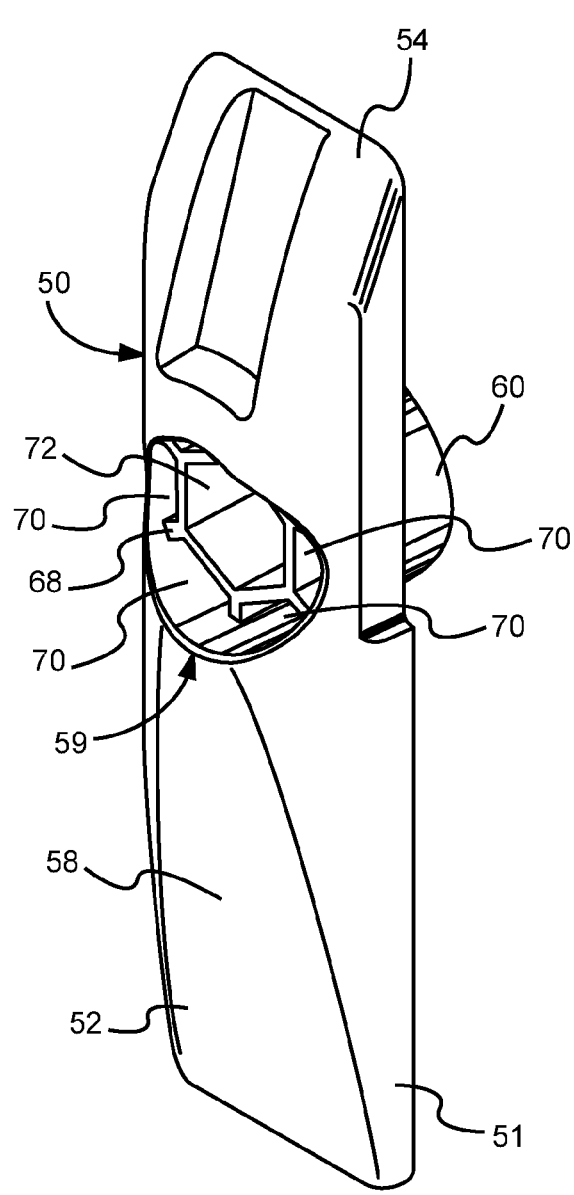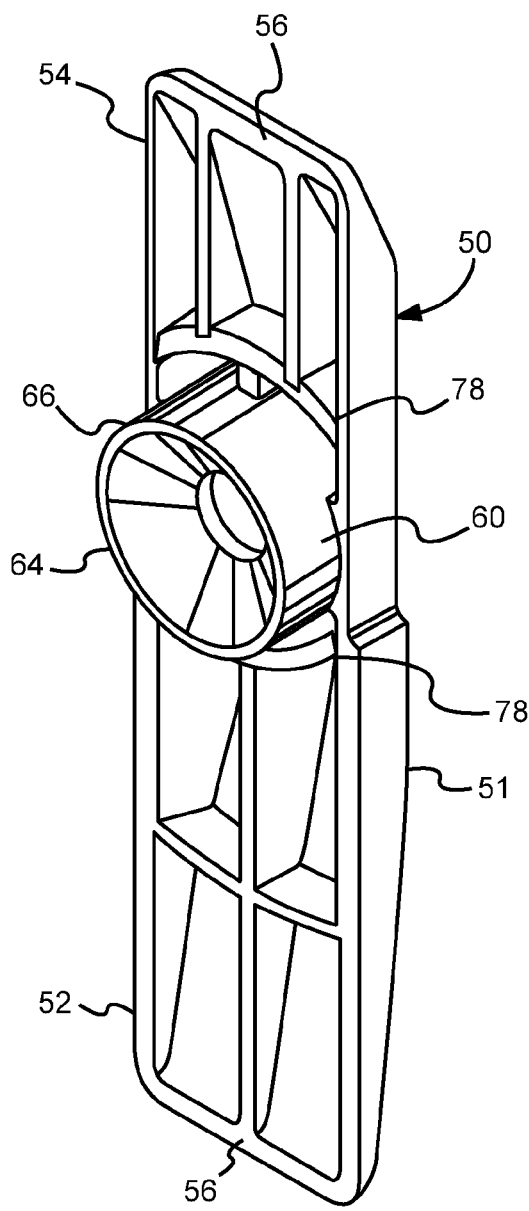
Fig. 5
Fig. 6

WALL ANCHOR SYSTEM

CROSS-REFERENCE TO RELATED APPLICATION

This application is a continuation-in-part of U.S. patent application Ser. No. 12/640,596, filed Dec. 17, 2009, which is incorporated herein by reference.

FIELD

The subject matter of this application is related generally to a system for mounting objects to a wall, and more particularly to an anchor system for mounting objects to a hollow wall.

BACKGROUND

Mounting systems for securing objects to a hollow wall are widely known in the art. Conventional hollow walls are constructed by attaching drywall panels to spaced-apart studs. The studs are secured to either the base or sidewall of a stable foundation (e.g., a concrete foundation). Such walls are considered hollow because an open space is defined between the drywall panels and the sidewall of the foundation (e.g., outer walls), or if drywall panels are secured to opposing sides of the studs (e.g., inner walls), between the opposing drywall panels. Often, the open space is filled with insulation or other materials.

Ideally, objects are secured to a wall by inserting conventional fasteners (e.g., bolts, screws, nails, etc.) through the object, through the drywall panel, and into a stud. Studs are typically made from a hard wood. Accordingly, objects are usually firmly secured when the conventional fasteners are able to be inserted into the stud. However, when studs are not conveniently positioned and the fasteners are secured only to the drywall panel, the coupling between the fasteners and the drywall is significantly inadequate for supporting heavier objects.

Conventional mounting systems are designed to more adequately secure objects to hollow walls when studs are not available. Some drywall mounting systems include anchors that expand into the drywall to improve the retention of the anchors. Other drywall mounting systems include anchor portions on both sides of a drywall panel. The anchor portion on the inner surface of the drywall panel presses against the inner surface to resist pull-out of the system. Often, however, the anchor portion on the inner surface of the panel is not large enough to adequately distribute the pull-out force over a large enough surface area of the inner surface to properly support heavier objects (e.g., people) on the wall. Other conventional drywall mounting systems suffer from similar or different shortcomings. For example, some conventional drywall mounting systems require two or more hands for proper installation on a hollow wall.

SUMMARY

The subject matter of the present application has been developed in response to the present state of the art, and in particular, in response to the problems and needs in the art that have not yet been fully solved by currently available wall anchor systems. Accordingly, the subject matter of the present application has been developed to provide a wall anchor system and associated apparatus, assemblies, and methods that overcomes at least some, if not all, of the shortcomings of the prior art.

Described herein are various embodiments of a wall anchor system for securing an object to a hollow wall. In certain implementations, the wall anchor system facilitates the securement of a heavy object (e.g., a person) to a hollow wall made of a conventional drywall panel. Generally, according to some embodiments, the wall anchor system is simply and easily installable into a hollow wall. In certain implementations, the wall anchor system can be installed using one hand (i.e., in a one-handed operation). In some embodiments, the wall anchor system includes an insert and an anchor positioned on opposing sides of a drywall panel, and a robust elastic member securely coupling the insert and the anchor. According to certain embodiments, the anchor of the wall anchor system has a large footprint to distribute the pull-out force over a large area, which results in a large load-bearing capacity of the anchor system.

According to one embodiment, described herein is a wall anchor system includes an insert that is positionable within a hole in a wall. The wall anchor system further includes an anchor that is insertable into and passable through the insert. Additionally, the wall anchor system includes an elastic member that couples the insert and anchor. The insert and anchor remain coupled via the elastic member as the anchor is inserted into and passes through the insert.

In some implementations of the system, the insert includes a hollow cylinder that defines an interior channel. The anchor may be insertable into and passable through the interior channel of the hollow cylinder. The insert can include retention elements positioned on an inner surface of the hollow cylinder. The retention elements can be engageable with the elastic member to couple the elastic member to the insert. In certain implementations, the elastic member is positioned within the interior channel of the insert when the elastic member is coupled to the insert and anchor. The anchor can include a hub and the elastic member may urge the hub into the interior channel of the insert after the anchor is passed through the insert.

According to some implementations of the system, the elastic member urges the anchor towards the insert after the anchor is passed through the insert. The anchor can include a hub. Further, the anchor may include a first arm extending away from the hub in a first direction and a second arm extending away from the hub in a second direction opposite the first direction. The first arm can be substantially shorter than the second arm.

In certain implementations, the elastic member includes a first end portion with a first connection, a second end portion with a second connection, and a third connection between the first and second connections. The second end portion is generally opposite the first end portion. The first and second connections are coupled to the insert and the third connection is coupled to the anchor. The elastic member can be coupled to the insert at a first end, wrap around the anchor, and be coupled to the insert at a second end. The elastic member can be made from a resiliently flexible material.

According to certain implementations of the system, the anchor includes an elastic member receiving portion that has a plurality of recesses. The elastic member includes a plurality of arms where the plurality of arms are matingly engageable with the plurality of recesses to couple the elastic member to the anchor.

In some implementations, the insert includes an interior channel and the anchor comprises a hub. The hub is positionable within the interior channel when the insert is positioned within the wall. The anchor also includes a beveled surface that is spaced-apart from and extends at least partially about the hub. A diameter of the hub is significantly smaller than a diameter of the interior channel of the insert. The beveled surface can include a diameter that is substantially equal to the diameter of the interior channel of the insert.

According to certain implementations of the system, following passage of the anchor through the insert with the insert positioned within the wall, the elastic member is configured to bias the anchor into engagement with the insert and the wall. In some implementations, the anchor includes a substantially planar wall engaging surface. The elastic member is configured to rotate the anchor and urge the wall engaging surface against the wall after passage of the anchor through the insert with the insert positioned within the wall.

In yet another embodiment, a method for mounting an object to a wall having an exterior surface and an interior surface includes positioning an insert within a hole in the wall. The method also includes coupling an elastic member to the insert and coupling the elastic member to an anchor. With the anchor positioned adjacent the exterior surface of the wall, the method includes passing the anchor through the insert to a position adjacent the interior surface of the wall. As the anchor is passed through the insert from the position adjacent the exterior surface of the wall to the position adjacent the interior surface of the wall, the elastic member remains coupled to the insert and the anchor.

According to some implementations of the method, the anchor includes a hub, and a first arm extending away from the hub in a first direction and a second arm extending away from the hub in a second direction opposite the first direction. The first arm is substantially shorter than the second arm. Passing the anchor through the insert includes passing the second arm through the insert before the first arm.

In yet certain implementations of the method, after passing the anchor through the insert, the anchor is orientated in a position substantially perpendicular to the interior surface of the wall. The method may further include urging the anchor from the position substantially perpendicular to the interior surface of the wall to a position substantially parallel to the interior surface of the wall via a bias of the elastic member.

According to some implementations of the method, the insert includes an interior channel and the anchor includes a hub. The method may further include urging the hub into the interior channel of the insert via a bias of the elastic member after passing the anchor through the insert to the position adjacent the interior surface of the wall.

In yet another embodiment, a wall anchor system for securing an object to a wall having a formed opening extending between an exterior surface and an interior surface of the wall, includes an insert that is positionable within the opening of the wall. The system includes an anchor that is insertable into and passable through the insert when positioned within the opening of the wall from a first position adjacent to the exterior surface of the wall to a second position adjacent to the interior surface of the wall. The system also includes an elastic member that is coupled to the insert and anchor in the first and second positions. The elastic member is configured to urge the anchor when in the second position into engagement with the insert and interior surface of the wall. Additionally, the system includes a mounting component that includes a fastener and an object connector coupled to the fastener. The fastener is insertable through the insert from adjacent the exterior surface of the wall and tightenable to the anchor in the second position to tighten the anchor against the interior surface of the wall. The object is coupleable to the object connector to secure the object to the wall.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 5 is a rear perspective view of an anchor of the wall anchor assembly of FIG. 3 according to one embodiment;

FIG. 6 is a front perspective view of an anchor of the wall anchor assembly of FIG. 3 according to one embodiment;

DETAILED DESCRIPTION

Figure 1:
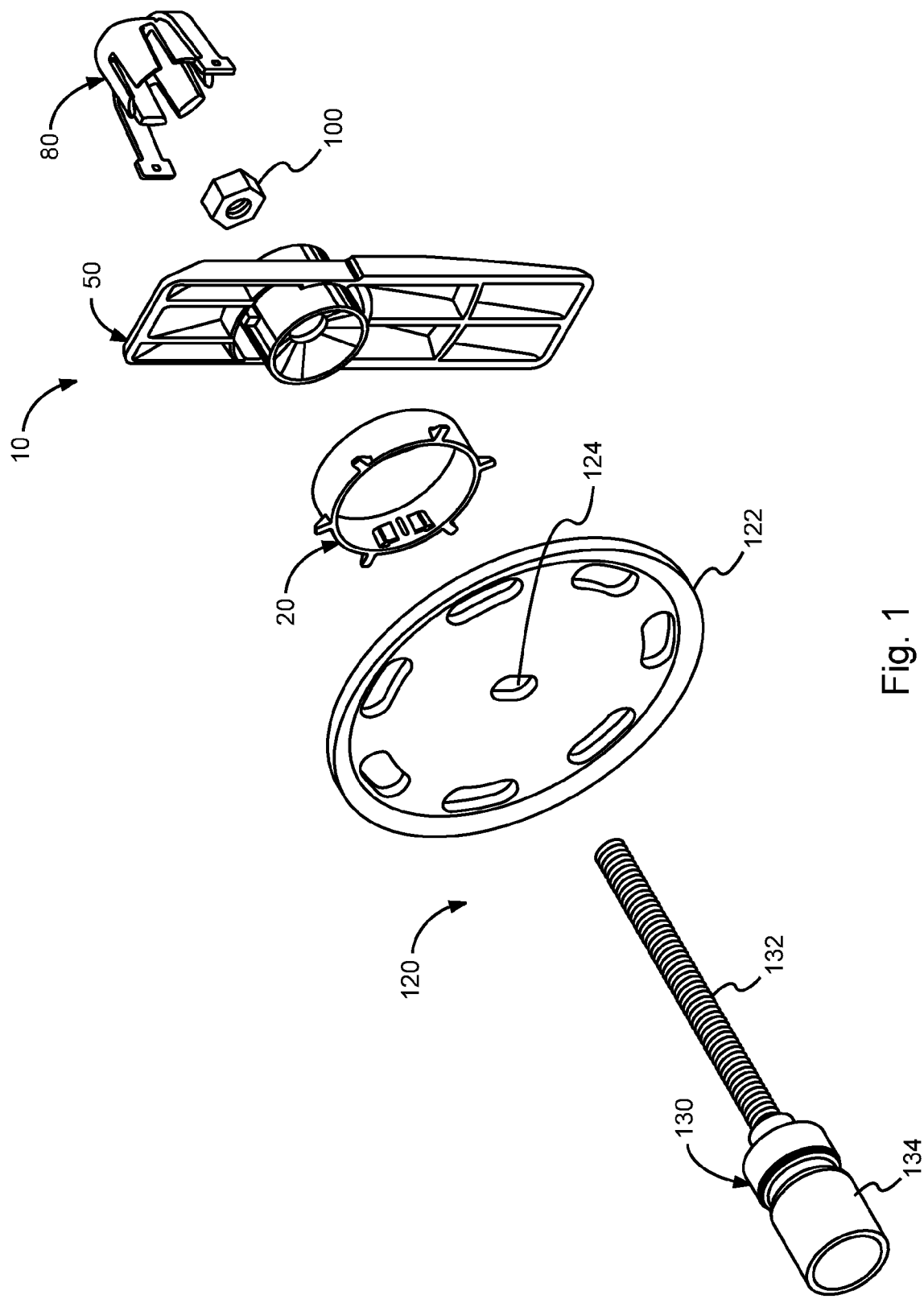
FIG. 1 is an exploded perspective view of an wall anchor system and an object mounting component according to one embodiment.
Figure 2:
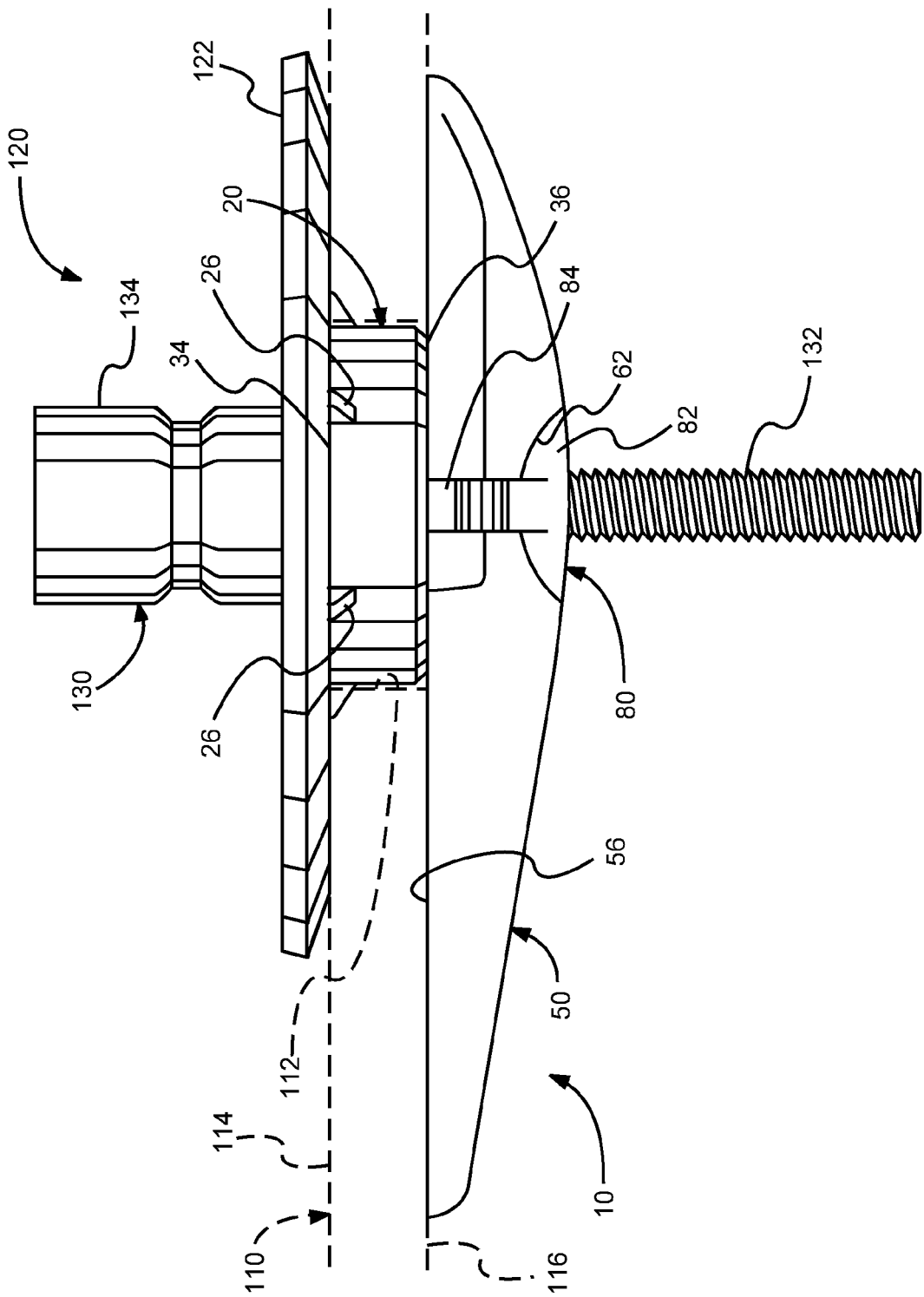
FIG. 2 is a side elevation view of the wall anchor system and object mounting of FIG. 1 anchored to a wall according to one embodiment.
Figure 3:
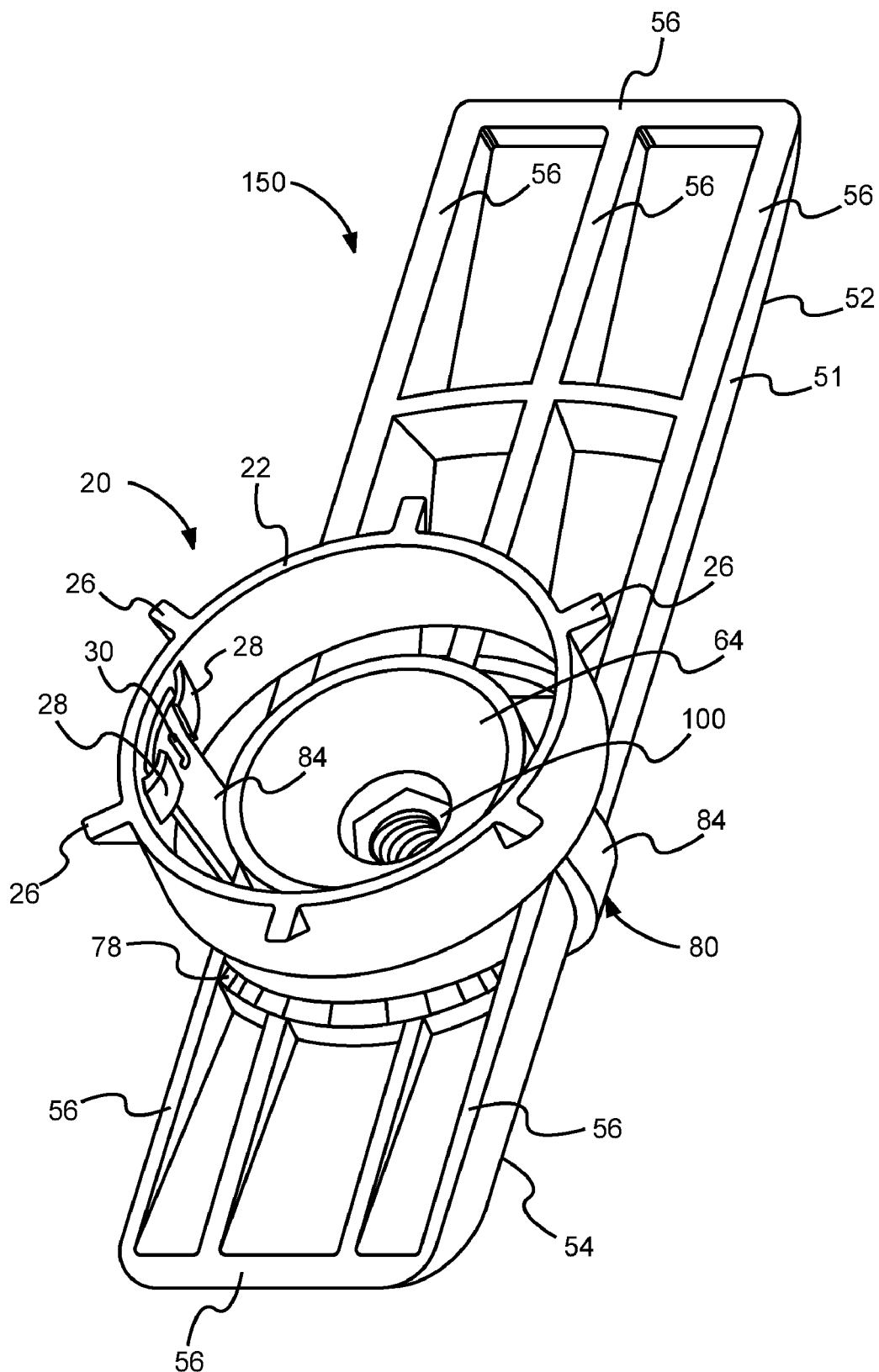
FIG. 3 is a perspective view of a wall anchor assembly according to one embodiment in a post-installation configuration with a wall to which the wall anchor assembly would be anchored removed for clarity in showing the features of the wall anchor assembly.

One representative embodiment of a wall anchor system 10 for anchoring an object to a hollow wall is shown as separated components in FIG. 1 and in a post-installation configuration in FIGS. 2 and 3. The wall anchor system 10 includes an insert 20, anchor 50, and elastic member 80.

Figure 4:
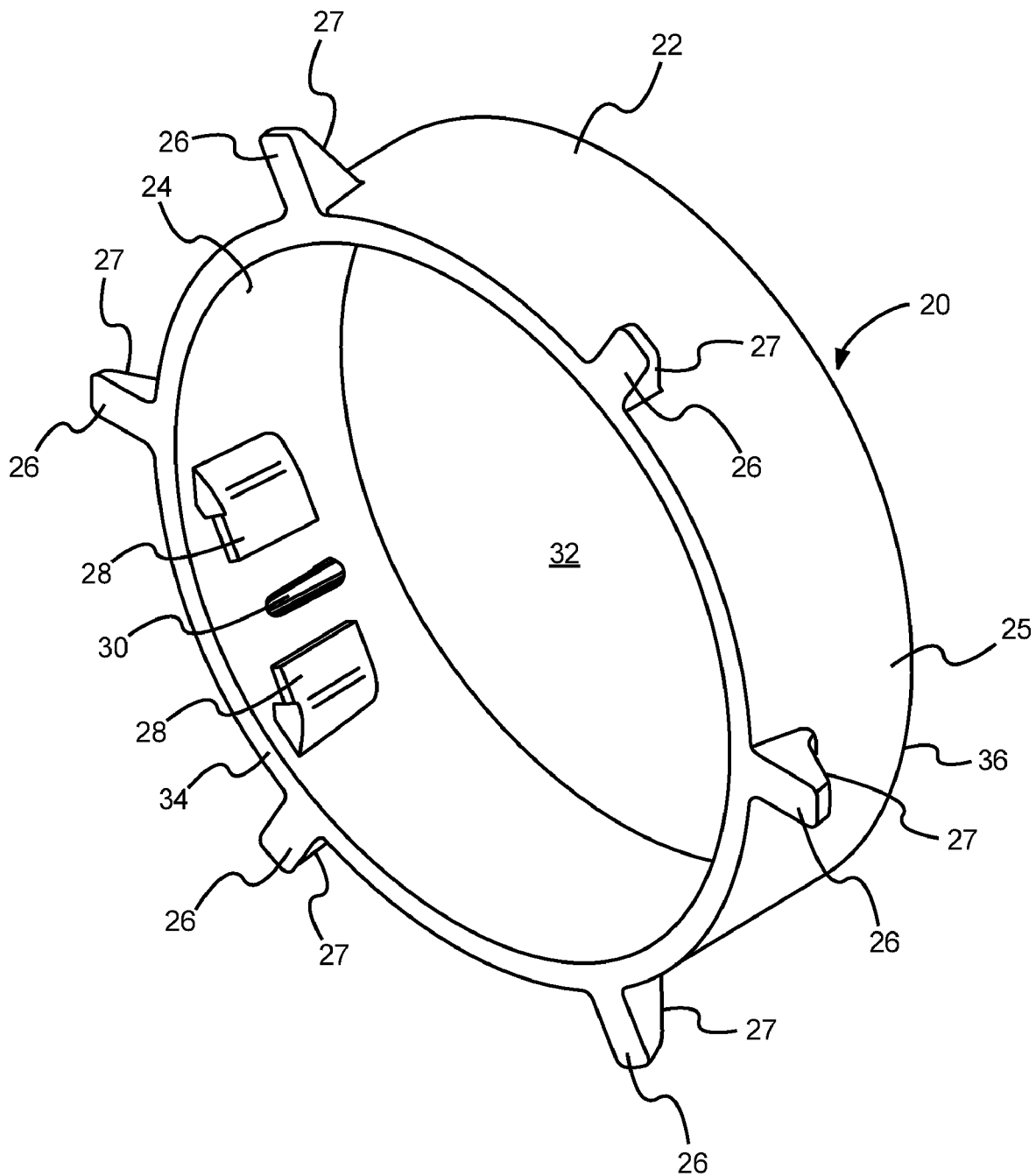
FIG. 4 is a perspective view of an insert of the wall anchor assembly of FIG. 3 according to one embodiment.

Referring to FIGS. 1-4, the insert 20 (e.g., insertion component) includes a generally cylindrical housing 22 that has an interior surface 24 defining an interior space or channel 32 (see, e.g., FIG. 4). Additionally, the insert 20 includes a plurality of teeth 26 positioned circumferentially about an exterior surface 25 of the housing 22 proximate a proximal end 34 of the housing. The teeth 26 each include a leading edge 27 that tapers radially inwardly in a direction from the proximal end 24 of the housing 22 to a distal end 36 of the housing. In alternative embodiments, instead of or in addition to the teeth 26 specifically shown in FIGS. 1 and 4, the insert 20 may include other wall engaging features, such as spikes, positioned at any of various locations on the exterior surface 25 of the housing.

The insert 20 also includes opposing sets of elastic member retention elements coupled to opposing sides of the interior surface 24 of the housing 22. Each set of elastic member retention elements includes a pair of tabs 28 and a prong 30. The tabs 28 extend from the interior surface 24 and bend toward each other to define respective spaces between the tabs and the interior surface 24. The prong 30 of each set of elastic member retention elements is positioned between the tabs 28 of the respective set. Generally, the prong 30 extends from the interior surface 24 upwardly toward the proximal end 34 of the housing 22. In the illustrated embodiment, the sets of elastic member retention elements are coupled to the interior surface of the housing 22 nearer the proximal end 34 than the distal end 36. However, in other embodiments, the sets of elastic member retention elements can be positioned on the interior surface 24 at any of various locations between the proximal and distal ends 34, 36. Additionally, in some embodiments, the sets of elastic member retention elements do not include the tabs 28, and may include other types of retention elements to retain the elastic member 80 to the insert 20.

Referring now to FIGS. 1-3, 5, and 6, the anchor 50 or elongated anchor of the wall anchor system 10 includes a relatively elongate base 51 and a hub 60 coupled to a mounting surface 56 of the base. Generally, the base 51 can have a substantially rectangular shape in plan view. The base 51 includes a rear or distal surface 58 opposing the mounting or proximal surface 56. Generally, the mounting surface 56 is substantially flat, and may be partitioned by multiple recesses as shown in the illustrated embodiment. More specifically, the mounting surface 56 may include multiple relatively narrow and spaced-apart surfaces, which are configured to distribute loads to a wall in the same manner as a single continuous mounting surface. However, in other embodiments, the mounting surface is a substantially flat and continuous surface without intervening recesses, which may be included for manufacturing purposes to reduce materials and weight. In some embodiments, the mounting surface 56 may include gripping features, such as teeth, ridges, spikes, and the like, for gripping or penetrating the interior surface 116 of the wall 110.

The rear surface 58 of the base 51 may or may not be flat without departing from the essence of the present disclosure. However, preferably, the rear surface 58 is substantially free of sharp edges and elevated protrusions to facilitate ease in inserting the anchor through the interior space 32 of the housing 22 during installation of the wall anchor system 10 as will be described in more detail below. The base 51 includes a leading portion 52 and a trailing portion 54 coupled together at the hub 60, and extending in generally opposite directions away from the hub. In other words, the hub 60 is positioned between the leading and trailing portions 52, 54. As illustrated, in certain embodiments, the leading portion 52 is longer than the trailing portion 54 for ease in installing the anchor system 10 to a wall. In other embodiments, the leading and trailing portions 52, 54 are approximately the same length.

The hub 60 includes a protrusion that extends from the mounting surface 56 of the base 51 (see, e.g., FIG. 6). As illustrated, the hub 60 is a generally cylindrically-shaped protrusion. The hub 60 also includes an inverted-conical-shaped or tapered recess 64 formed in a proximal surface of the hub. More specifically, the recess 64 is defined by a surface that converges from a proximal end of the hub 60 towards the base 51. The tapering surface of the recess 64 facilitates the insertion of a fastener (e.g., fastener 130 of FIGS. 1 and 2) through the hub 60 and base 51 during the process of securing an object to the wall as will be described in more detail below.

The size and shape of the hub 60 corresponds with the size and shape of the interior space 32 of the channel 32 of the insert 20. More specifically, the hub 60 is sized and shaped to fit within or be inserted into the channel 32. In certain embodiments as shown, the hub 60 is significantly smaller than the channel 32 such that the hub does not interfere with the elastic member retention elements of the insert 20 and to provide substantially clearance between the hub and channel when inserting the hub into the channel during installation. In such embodiments, the anchor 50 can include semi-circular beveled surfaces 78 extending at least partially about the hub 60 (see, e.g., FIGS. 3 and 6). The beveled surfaces 78 can have an outer periphery that corresponds with the circumference of the interior space 32 of the insert 20. In this manner, the beveled surfaces 78 are configured to matingly engage (e.g., seat) the insert 20 to coaxially align the hub 60 and the insert. Accordingly, the hub 60 can matingly engage the insert without the hub interfering with the elastic member retention elements. In other embodiments, the hub 60 can be just smaller than the channel 32 such that the hub itself is nestably engageable with the interior surface 24 of the insert 20.

Referring to FIG. 5, the anchor 50 includes an elastic member receiving portion 59 formed in the rear surface 58 of the base 51. In the illustrated embodiment, the receiving portion 59 is arranged on the opposite side of the base 51 as the hub 60. More specifically, in certain implementations, the receiving portion 59 is coaxially aligned with the hub 60.

In some implementations, portions of the receiving portion 59 extend into or are formed in the protrusion defining the hub 60. The receiving portion 59 is configured to receive and matingly engage corresponding features of the elastic member 80. For example, the receiving portion 59 includes a plurality of outer receptacles 70 and an inner receptacle 72 positioned between the outer receptacles. Generally, the outer receptacles 70 are defined between a circular aperture 62 formed in the base 51 and sidewalls 68 formed within the aperture. The inner receptacle 72 is defined between inner surfaces of the sidewalls 68. The outer receptacles 70 can have any of various sizes, shapes, and numbers. In the illustrated embodiment, the receiving portion 59 includes six outer receptacles 70 each with a substantially trapezoidal cross-sectional shape. The inner receptacle 72 has a cross-sectional shape corresponding with a fastener receiving element 100 (e.g., a nut) that is matingly positionable within the inner receptacle. The nut 100 includes a threaded aperture 102 configured to threadably engage the threads of an installation fastener. The inner receptacle 72 may have a predefined depth such that at least a portion of the inner receptacle is accessible after the nut 100 is matingly positioned within the receptacle. In alternative embodiments, the threaded aperture 102 is integrated into the base 51 or receiving portion 59 (e.g., is co-molded with the base) such that a separate internally-threaded nut is not necessary. In such embodiments, the inner receptacle 72 may be omitted.

As shown in FIG. 6, the anchor 50 includes a fastener hole 66 that extends entirely through the anchor 50. Preferably, the fastener hole 66 is coaxially aligned with the hub 60 and receiving portion 59. The fastener hole 66 is large enough to allow insertion of a fastener through the hole, but smaller than the inner receptacle 72 and nut 100 such that the nut can be properly seated or supported within the inner receptacle 72 without passing through the hole. The insert 20 and anchor 50 can be made from any of various materials, such as, for example, a polymer (e.g., PVC, ABS, reinforced plastic, polyethylene, etc.) and a metal (e.g., aluminum).

Figure 7:
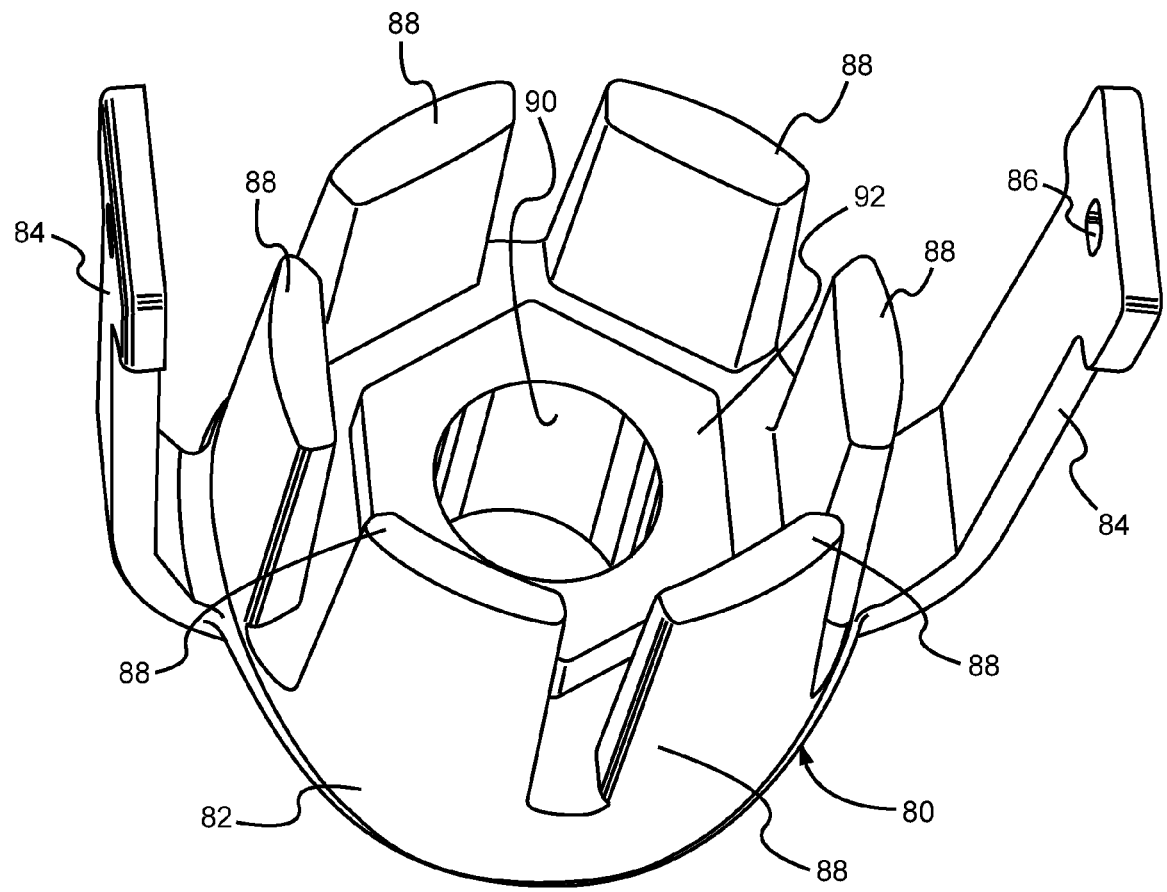
FIG. 7 is a perspective view of an elastic member of the wall anchor assembly of FIG. 3 according to one embodiment.

Referring to FIG. 7, the elastic member 80 or elastic holding member includes a cap or connection 82 from which extend a pair of straps 84 and a plurality of receptacle mating arms 88. The straps 84 extend partially laterally away from the cap 82 before bending substantially vertically or uprightly away from the cap and terminating at free ends. In contrast, the arms 88 extend substantially vertically or uprightly directly from the cap. The free ends of the straps 84 include apertures or connections 86 sized and shaped to receive the prongs 30 of the insert 20. Accordingly, the elastic member 80 is coupled to the insert 20 via a two-point connection (e.g., a first connection 86 on one end portion of the strap 84 and a second connection 86 on an opposite end portion of the strap).

Further, the free ends of the straps 84 have a width that is just smaller than the distance between opposing tabs 30 of the sets elastic member retention elements. The size, shape, and number of the arms 88 correspond with the size, shape, and number of the outer receptacles 70. In other words, each of the arms 88 is configured to be matingly received within (e.g., inserted into) a respective one of the outer receptacles 70. Accordingly, the elastic member 80 is coupled to the anchor 50 via a single-point connection. In other words, the elastic member 80 is effectively a single elastic element with its two free ends coupled to the insert 20 and a middle portion of the single element coupled to the anchor. Such a configuration may provide distinct advantages over the use of two separate elastic elements with first ends coupled to the insert and second ends coupled to the anchor to form a first two-point connection and a second two-point connection. The length of each arm 88 is predetermined such that when the arms are properly inserted into the outer receptacles 70, the outer surface of the cap 82 is substantially flush with the rear surface of the base 51 or anchor 50 as shown in FIG. 2.

In the illustrated embodiment, the outer surface of the cap 82 is shaped or contoured to correspond with the shape or contour of the rear surface 58 of the base 51. In alternative embodiments, the outer surface of the cap 82 is not flush with the rear surface 58 of the base 51. Although in the illustrated embodiments, the receiving portion 59 includes outer receptacles 70 and the elastic member 80 includes corresponding arms 88 for insertion into the receptacles, in other embodiments, the receiving portion 59 can include outer arms and the elastic member can include corresponding receptacles for receiving the outer arms or the receptacle. Further, in some embodiments, the elastic member 80 can be coupled to the anchor 50 using any of various coupling techniques other than those illustrated without departing from the essence of the subject matter of the present disclosure.

The elastic member 80 also includes an aperture 90 positioned between the arms 88 and extending through the cap 82. The aperture 90 is sized and shaped to allow a fastener (e.g., fastener 130 of FIG. 2) to extend through the elastic member 80 via the aperture. Additionally, the elastic member 80 may include a nut retention element or protrusion 92 extending from the cap 82 and positioned between the arms 88. The nut retention element 92 has a cross-sectional shape corresponding with the cross-sectional shape of the inner receptacle 72 of the receiving portion 59. When the arms 88 are properly inserted into the outer receptacles 70, the nut retention element 92 is seated within or inserted into the accessible portion of the inner receptacle 72 to effectively cap the receptacle and prevent the nut 100 from sliding axially out of the receptacle. The elastic member 80 can be made from any of various elastic or elastomeric (e.g., resiliently flexible) materials, such as, for example, rubber, polymer, composite, and the like. Additionally, in certain embodiments, the elastic member 80 is made of a monolithic one-piece construction.

Referring to FIGS. 1 and 2, the wall anchor system 10 also includes a fastener 130 configured to securably couple the anchor 50 to an object. The fastener 130 includes a threaded shank 132 and an object connector 134 coupled to a proximate end of the shank. The object can be any of various objects for which mounting on a wall is desired. The objects can include, among many others, fixtures, grab bars, shelving, TVs, pictures, minors, cabinets. Often, for heavier objects or objects that support heavy items, such as people, the objects include separate mounting components that facilitate mounting of the objects to the wall. The mounting components are attached directly to the wall, and the heavier objects are secured to the mounting components. Mounting components can include any of various conventional components, such as hooks, pins, brackets, plates, etc., or any of various custom components specifically configured for use with a particular object.

In the illustrated embodiment, the object includes a main object (not shown) and a mounting component 120 to which the main object is attachable. The mounting component 120 includes a mounting plate 122 and the cantilevered object connector 134 coupled to the fastener shank 132. The mounting plate 122 includes a fastener aperture 124 through which at least the shank 132 of the fastener 130 is extendable. The aperture 124 of the mounting plate 122 is large enough to allow passage of the shank 132, but small enough to prevent passage of the object connector 134. In alternative embodiments, the fastener 130 is a conventional fastener with a threaded shank and head. In such alternative embodiments, the object connector 134 is substantially hollow and can be either securely attached to the mounting plate 122 prior to installation or secured to the mounting plate by positioning a separate object connector between the fastener head and mounting plate. The mounting component 120 can be made from any of various materials, such as, for example, a polymer (e.g., PVC, ABS, reinforced plastic, polyethylene, etc.) and a metal (e.g., aluminum).

Figure 8:
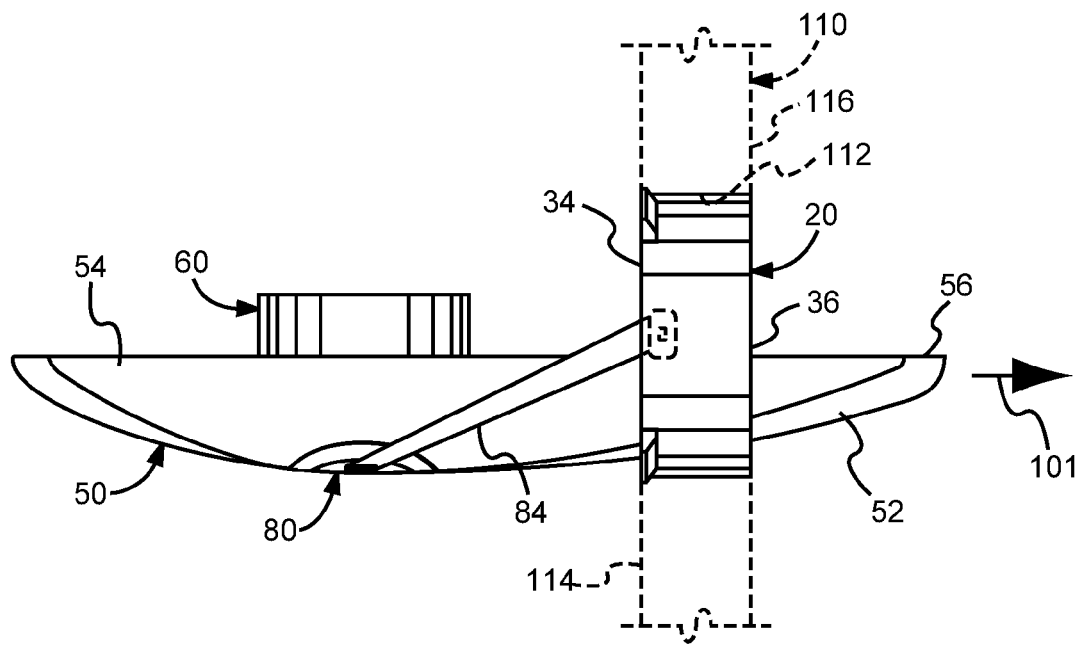
FIG. 8 is a side elevation view of an anchor of a wall anchor assembly being inserted into an insert positioned within a hole in a wall during an installation process of the wall anchor assembly according to one embodiment.
Figure 9:
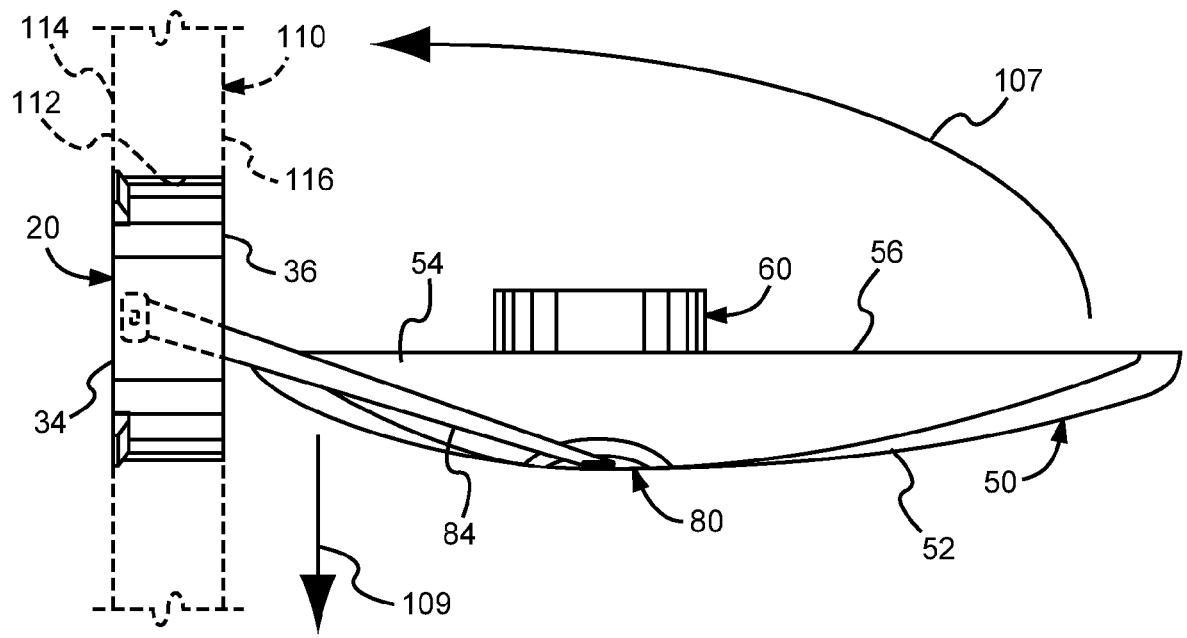
FIG. 9 is a side elevation view of an anchor of a wall anchor assembly being inserted completely through an insert positioned within a hole in a wall during an installation process of the wall anchor assembly according to one embodiment.

To facilitate installation of the wall anchor system 10 to a wall, the wall anchor system is preassembled to form an anchor assembly 150 as shown in FIGS. 8 and 9. The anchor assembly 150 includes the insert 20 and anchor 50 coupled together by the elastic member 80. More specifically, the anchor assembly 150 is formed by coupling the elastic member 80 to the insert 20 and anchor 50. The elastic member 80 is coupled to the insert 20 by inserting the free ends of the straps 84 between respective pairs of tabs 28 and inserting the prongs 30 through respective apertures 86 of the straps 84 (see, e.g., FIG. 3). The elastic member 80 is coupled to the anchor 50 by engaging (e.g., inserting) the arms 88 and nut retention element 92 into the receptacles 70, 72, respectively, of the elastic member into the elastic member receiving portion 59 of the base 51 (see, e.g., FIG. 2). Prior to inserting the arms 88 and nut retention element 92 into the receptacles 70, 72, the nut 100 is positioned within the inner receptacle 72.

The anchor assembly is configurable in a pre-installation configuration and a post-installation configuration. In the pre-installation configuration, the anchor 50 is positioned on a proximal side of the insert 20 adjacent the proximal end 34 of the insert. In this configuration, the straps 84 of the elastic member 80 remain coupled with the anchor 50 and extend from within the insert 20 to the anchor.

The wall anchor assembly installation procedure includes inserting the leading or longer portion 52 of the anchor 50 into the interior space 32 of the insert 20 in a direction 101 (e.g., substantially perpendicular to and away from the interior surface 116 of the wall 110) as shown in FIG. 8. The insert 20 is positioned at least partially within an opening 112 formed in a wall 110 with the distal end 36 positioned within the wall away from an exterior surface 114 of the wall and the proximal end 34 substantially flush with the outer surface of the wall. The opening 112 of the wall 110 can be formed using any of various drilling or forming techniques know in the art. The teeth 26 of the insert 20 are configured to penetrate the wall 110 either upon insertion of the insert into the opening 112, or upon tightening the mounting plate 122 and anchor 50 to the wall as will be describe in more detail below. When penetrating the wall 110, the teeth 26 restrict (e.g., prevent) rotation of the insert 20 relative to the wall. With the insert 20 in this position within the wall 110, as the longer portion 52 of the anchor 50 is inserted into the interior space 32, the longer portion also is inserted into the opening 112 in the wall. The anchor 50 is further inserted through the interior space 32 and opening 112 in the wall 110 until the hub 60, elastic member receiving portion 59, and trailing or shorter portion 54 of the anchor passes completely through the insert 20 and is positioned adjacent the interior surface 116 of the wall opposite the exterior surface 114 as shown in FIG. 9. In certain implementations, the shorter portion 54 of the anchor 50, being shorter in length, assists in (e.g., makes easier) the installation process by reducing the clearance (e.g., the distance away from the interior surface 16) necessary to fully insert the anchor through the insert 20.

Further, as shown in FIG. 9, once the elastic member receiving portion 59 of the anchor 50 reaches a distance away from the elastic member retention elements of the insert 20 that is greater than an unbiased length of the straps 84 of the elastic member 80, the bias in the straps 84 urges (e.g., rotates) the anchor back toward the insert (e.g., by urging the longer portion 56 in the direction 107 (e.g., arcuately back toward the wall) and the shorter portion 54 in the direction 109 (e.g., substantially downwardly along the interior surface 116 of the wall)). Accordingly, in certain embodiments, the bias in the straps 84 is predetermined according to the length of the shorter portion 54 of the anchor 50 such that the shorter portion can clear the insert without requiring excessive pushing force to counter the bias of the elastic member, but ensuring sufficient bias in the elastic member to urge the anchor back toward the insert after the anchor clears the insert. In other words, the length and/or bias of the straps 84 is proportional to the length of the shorter portion 54 of the anchor 50.

Once the shorter portion 54 of the anchor 50 clears the distal end 36 of the insert 20, the bias of the elastic member 80 urges the anchor 50 into an upright orientation relative to the wall 110 as shown in FIG. 2. In the upright position, the mounting surface 56 of the anchor is parallel to the interior surface 116 of the wall 110. Additionally, preferably, the longer portion 52 of the anchor 50 is vertically upright or above the shorter portion 54 to distribute across a larger area downwardly directly pull-out loads (e.g., moments) applied to the support member 124 by the object secured to the support member (e.g., provide more leverage in view of the pull-out loads). In certain embodiments, upright orientation of the anchor 50, including positioning of the longer portion 52 above the shorter portion 54, can be ensured based on the rotational orientation of the insert in the opening 112. More specifically, due to the bias of the elastic member 80, which acts to return the anchor 50 to an unbiased or starting position relative to the insert, the orientation of the anchor 50 relative to the insert is predetermined or known based on the orientation of the insert.

In addition to biasing the anchor 50 into an upright orientation, after the shorter portion 54 clears the insert 20, the hub 60 of the anchor is urged or drawn into the interior space 32 of the insert as shown in FIG. 2. In alternative embodiments, such as for walls having a thickness greater than a length of the insert (e.g., where the insert extends through only a portion of the thickness of the wall), the anchor 50 is urged by the elastic member 80 into engagement with (e.g., inserted into) the hole formed in the wall instead of the insert. Ultimately, in some embodiments, either by the bias of the elastic member 80 or by tightening the anchor 50 against the wall 110, the beveled surface 78 comes into contact with either the proximal end 36 of the insert 20 or the hole in the wall and seats against the proximal end of the insert or hole to coaxially align the hub with the insert or hole, respectively. In certain implementations, an installation tool, such as a flat head screwdriver, can be used to push the anchor 50 through the insert 20.

With the anchor 50 positioned adjacent the interior surface 116 of the wall 110 in the upright position, the fastener 130 can be inserted through an aperture 124 in the mounting plate 122, through the fastener hole 66 of the hub 60, and into threadable engagement with the threaded aperture of the bolt 100. As the fastener 130 is rotated in a tightening direction, engagement between the threads of the fastener 130 and bolt 100 urge the anchor 50 and mounting plate 122 toward each other. The fastener 130 is tightened until the anchor 50 and mounting plate 122 exert sufficient or desired opposing forces on the wall 110 (e.g., are tightened against the wall), at which point the wall anchor system 10 is considered adequately installed on the wall. An object (not shown) can then be attached to the support member 134 to complete the object-installation procedure.

As the anchor 50 is inserted through interior space 32 of the insert 20, the elastic member 80 remains secured to the insert 20 and anchor 50. In other words, the anchor 50 remains coupled (e.g., tethered) to the insert 20 throughout the transition from the pre-installation configuration to the post-installation configuration. Accordingly, loss of the anchor 50 during the installation procedure is virtually eliminated.

Reference throughout this specification to "one embodiment," "an embodiment," or similar language means that a particular feature, structure, or characteristic described in connection with the embodiment is included in at least one embodiment of the present subject matter. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more particular embodiments of the present subject matter. However, absent an express correlation to indicate otherwise, an implementation also may be associated with one or more other embodiments of the present subject matter.

The present subject matter may be embodied in other specific forms without departing from its spirit or essential characteristics. The described embodiments are to be considered in all respects only as illustrative and not restrictive. The scope of the disclosed subject matter is, therefore, indicated by the appended claims rather than by the foregoing description. All changes which come within the meaning and range of equivalency of the claims are to be embraced within their scope.

What is claimed is:

1. A wall anchor system, comprising:
   an insert positionable within a hole in a wall;
   an anchor insertable into and passable through the insert when the insert is positioned within the hole in the wall, the anchor being passable through the insert from a first position adjacent a first side of the wall to a second position adjacent a second side of the wall opposite the first side of the wall, wherein the anchor is configured to receive a fastener insertable through the insert when the insert is positioned within the hole in the wall and the anchor is in the second position; and
   an elastic member coupled to the insert and anchor when the anchor is positioned in the first and second positions.

2. The wall anchor system of claim 1, wherein the insert comprises a hollow cylinder defining an interior channel, the anchor being insertable into and passable through the interior channel of the hollow cylinder.

3. The wall anchor system of claim 2, wherein the insert comprises retention elements positioned on an inner surface of the hollow cylinder, the retention elements being engageable with the elastic member to couple the elastic member to the insert.

4. The wall anchor system of claim 2, wherein the elastic member is positioned within the interior channel of the insert when the elastic member is coupled to the insert and anchor.

5. The wall anchor system of claim 2, wherein the anchor comprises a hub, and wherein the elastic member urges the hub into the hole in the wall after the anchor is passed through the insert.

6. The wall anchor system of claim 1, wherein the elastic member urges the anchor towards the insert after the anchor is passed through the insert.

7. The wall anchor system of claim 1, wherein the anchor comprises a hub, the anchor further comprising a first arm extending away from the hub in a first direction and a second arm extending away from the hub in a second direction opposite the first direction, and wherein the first arm is substantially shorter than the second arm.

8. The wall anchor system of claim 1, wherein the elastic member comprises a first end portion comprising a first connection, a second end portion comprising a second connection, the second end portion being generally opposite the first end portion, and a third connection between the first and second connections, wherein the first and second connections are coupled to the insert and the third connection is coupled to the anchor.

9. The wall anchor system of claim 1, wherein the elastic member is coupled to the insert at a first end, wraps around the anchor, and is coupled to the insert at a second end.

10. The wall anchor system of claim 1, wherein the elastic member is made from a resiliently flexible material.

11. The wall anchor system of claim 1, wherein the anchor comprises an elastic member receiving portion comprising a plurality of recesses, and wherein the elastic member comprises a plurality of arms, the plurality of arms being matingly engageable with the plurality of recesses to couple the elastic member to the anchor.

12. The wall anchor system of claim 1, wherein the insert comprises an interior channel and the anchor comprises a hub, the hub being positionable within the interior channel when the insert is positioned within the wall.

13. The wall anchor system of claim 12, wherein the anchor further comprises a beveled surface spaced-apart from and extending at least partially about the hub, wherein a diameter of the hub is significantly smaller than a diameter of the interior channel of the insert, and wherein the beveled surface comprises a diameter that is substantially equal to the diameter of the interior channel of the insert.

14. The wall anchor system of claim 1, wherein following passage of the anchor through the insert with the insert positioned within the wall, the elastic member is configured to bias the anchor into engagement with the wall.

15. The wall anchor system of claim 1, wherein the anchor comprises a substantially planar wall engaging surface, and wherein the elastic member is configured to rotate the anchor and urge the wall engaging surface against the wall after passage of the anchor through the insert with the insert positioned within the wall.

16. A wall anchor system for securing an object to a wall having a formed opening extending between an exterior surface and an interior surface of the wall, comprising:
   an insert positionable within the opening of the wall;
   an anchor insertable into and passable through the insert when positioned within the opening of the wall from a first position adjacent to the exterior surface of the wall to a second position adjacent to the interior surface of the wall;
   an elastic member coupled to the insert and anchor in the first and second positions, the elastic member being configured to urge the anchor when in the second position into engagement with the interior surface of the wall; and
   a mounting component comprising a fastener and an object connector coupled to the fastener, wherein the fastener is insertable through the insert from adjacent the exterior surface of the wall and tightenable to the anchor in the second position to tighten the anchor against the interior surface of the wall, the object being coupleable to the object connector to secure the object to the wall.

17. A wall anchor system, comprising:
   an insert positionable within a hole in a wall, wherein the insert comprises a hollow cylinder defining an interior channel;
   an anchor insertable into and passable through the insert when the insert is positioned within the hole in the wall, the anchor being passable through the interior channel of the hollow cylinder of the insert from a first position adjacent a first side of the wall to a second position adjacent a second side of the wall opposite the first side of the wall; and
   an elastic member coupled to the insert and anchor when the anchor is positioned in the first and second positions;

wherein the insert comprises retention elements positioned on an inner surface of the hollow cylinder, the retention elements being engageable with the elastic member to couple the elastic member to the insert.

18. A wall anchor system, comprising:
   an insert positionable within a hole in a wall, wherein the insert comprises a hollow cylinder defining an interior channel;
   an anchor insertable into and passable through the insert when the insert is positioned within the hole in the wall, the anchor being passable through the interior channel of the hollow cylinder of the insert from a first position adjacent a first side of the wall to a second position adjacent a second side of the wall opposite the first side of the wall, wherein the anchor comprises a hub; and
   an elastic member coupled to the insert and anchor when the anchor is positioned in the first and second positions;
   wherein the elastic member urges the hub into the hole in the wall after the anchor is passed through the insert.

* * * * *

UNITED STATES PATENT AND TRADEMARK OFFICE
CERTIFICATE OF CORRECTION

| | | |
|---|---|---|
| PATENT NO. | : 8,303,225 B2 | Page 1 of 1 |
| APPLICATION NO. | : 13/103919 | |
| DATED | : November 6, 2012 | |
| INVENTOR(S) | : Jacob Kearl et al. | |

It is certified that error appears in the above-identified patent and that said Letters Patent is hereby corrected as shown below:

Column 8, Line 34
    "TVs, pictures, minors, cabinets."---should read "TVs, pictures, mirrors, cabinets."

Signed and Sealed this
Eighteenth Day of December, 2012

David J. Kappos
*Director of the United States Patent and Trademark Office*